June 19, 1956  W. B. WOODRING  2,751,427
BATTERY
Filed March 28, 1951
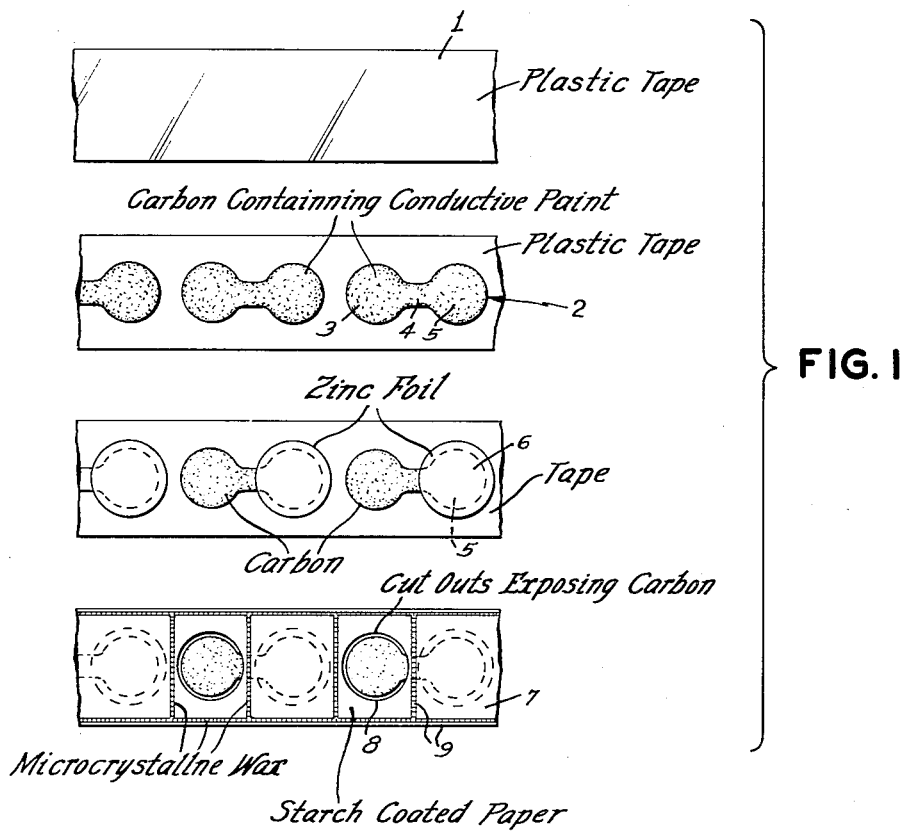
FIG. 1
FIG. 2
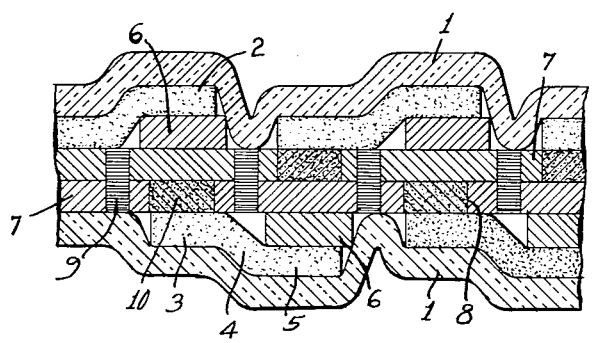
FIG. 3
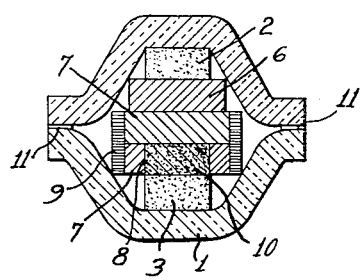
INVENTOR
*William B. Woodring*
BY
*Dennis, Edmonds, Morton, Barrows and Taylor*
ATTORNEYS

United States Patent Office 2,751,427
Patented June 19, 1956

2,751,427
BATTERY

William B. Woodring, Hamden, Conn., assignor to Olin Mathieson Chemical Corporation, a corporation of Virginia Application March 28, 1951, Serial No. 217,992

12 Claims. (Cl. 136—111)

This invention relates to primary batteries and more particularly to a battery in ribbon form in which any desired number of cells may be readily assembled to form a battery of a desired voltage.

In constructing the battery of the present invention I form a pair of tape units each provided with a number of spaced pairs of partial cells of alternating polarity. These units are assembled with the tapes face to face and offset so that complementary half cells are opposite to each other. The units are so formed that an electronically conductive path is formed between adjacent pairs of cells when the tapes are assembled.

The advantages of such construction will be apparent. Construction of the two complementary units in ribbon form lends itself to continuous line production of batteries. While the battery is intended for supply of voltage at small current drain, it may be formed of any desired number of cells by merely using ribbons of the necessary length and connecting terminals to each end of the battery.

The principle of assembly may also be applied to series cells of appreciable capacity by the provision of thicker depolarizing layers and thicker separator sheets in the ribbon assembly. Other means may be employed for increasing the thickness of the depolarizer to increase the capacity and still employ the method of assembly herein disclosed.

In the accompanying drawing I have shown one embodiment of the invention. In this showing:

Fig. 1 is a view of the plastic tape or ribbon illustrating the several steps in its construction, the upper view showing the tape, the second view showing the carbon applied to the tape, the third view showing the zinc anodes arranged over a portion of each of the carbon members, and the fourth view showing the starch coated paper, which serves as a separator, applied to the tape;

Fig. 2 is a longitudinal, sectional view, on an enlarged scale, illustrating the manner in which two tapes are assembled to construct the battery; and Fig. 3 is a transverse, sectional view.

Referring to the drawing, I provide a tape 1 of a suitable dielectric, plastic material which may be of any desired width and of indeterminate length. As stated, I employ two of these tapes in the construction of a battery. On each of the tapes at spaced intervals I apply a carbon containing conductive paint. This may consist of acetylene black in a polyvinyl acetal resin or any other suitable binder. The carbon may be printed on the tape, as illustrated at 2 in Fig. 1 of the drawing. The individual printings may be shaped as shown or in in other suitable form, but each printing consists of a portion 3 serving as the cathode of one cell, a connecting portion 4 for forming a connection between two cells of a pair, and a portion 5 which contacts with the anode of the second cell of the pair. Elements 2 may likewise consist of a suitable conductive film prepared in the desired shape and adhered to tape 1.

In the next step a zinc anode 6 is placed over each portion 5 of the carbon prints. It may either be in the form of a zinc foil cut to the proper size or may be applied by dust or vapor phase coating. A sheet of starch coated paper 7 is then placed over the tape, the starch coated paper being provided with cut-outs 8 to expose the portion 3 of each carbon print which is to serve as a cathode. A line of microcrystalline wax or other fibre impregnant 9 is then applied to the paper between the two cell units of each pair and preferably along the longitudinal edges, as indicated. In the openings 8 of the paper separator the exposed carbon paint is covered with a layer 10 of depolarizer mix. The depolarizer may be added in the form of a dust which is subsequently moistened with electrolyte after any excess has been removed by means of a doctor blade. Or, the depolarizer may be suspended in electrolyte solution and applied in proper position by printing or painting. Likewise, a suitable carrier such as porous paper or cloth may be coated or impregnated with a suspension of the depolarizer, containing a suitable binder if desired, from which sheets of suitable size and shape may be blanked and inserted in proper position.

The last step before assembling two of the strips to form a battery is to moisten the paper 7 with a suitable electrolyte solution.

Two of the tapes are then assembled face to face with the tape edges sealed together so that the anodes 6 of one tape are in registry with the depolarizer of the other tape. Thus, referring to Fig. 2 of the drawing, at the left end the portion 5 of a carbon print is in contact with a zinc anode 6 of the upper tape and this anode is covered by the separator 7. An opening 8 in the separator of the lower tape is in vertical alignment with the anode and the separator carrying a layer of depolarizing mix which is in contact with the cathode portion 3 of the carbon print of the lower tape. The electronic path extends from the cathode 3 of this end cell through the portions 4 and 5 of the carbon print contacting with the anode 6 of the next adjacent cell, which is in turn carried by the lower tape. This anode is covered by the separator 7 of the lower tape which is in turn in contact with the depolarizer mix in opening 8 of the upper tape. The depolarizer mix is in turn in contact with the cathode portion 3 of the next carbon print on the upper tape. The electronic path extends through other cells in the manner described to any length desired, and the desired voltage may be obtained by assembling ribbons of the necessary length. Suitable terminals are connected to the end electrodes of opposite polarity. The edge seal 11 may be conveniently accomplished by the application of suitable heat and pressure or by solvent sealing.

In one battery constructed in accordance with the present invention, the supporting members consisted of thermoplastic tape made of a polymerized vinyl resin, for example, polystyrene, or of suitable cellulose ester composition, for example cellulose acetate-butyrate. The tapes were .002" in thickness and the carbonaceous coatings 2, .001" in thickness, were applied thereon by a printing process. The starch paper layers were .002" in thickness and the anodes consisted of zinc foil .001" in thickness and ¼" in diameter. The resulting individual cells were .5" x .5", and a battery of seven cells displayed a voltage of seven volts as measured on an electronic volt meter.

Another battery had zinc foil anodes .001" thick and .5 to .625" in diameter. A complete battery containing eight cells connected in series displayed a voltage of 12 volts as measured by an electronic volt meter. When the battery was connected across the volt meter, a current of $7 \times 10^{-7}$ amperes resulted. The connection was maintained for a period of twenty-two hours, and at the end of that time, the battery displayed a voltage of six volts on the instrument.

While the invention has been described in connection with a primary battery employing Leclanché elements, it may of course be used in the construction of batteries employing any suitable electrochemical primary cell elements. Thus, I may employ anodes of magnesium with an electrolyte consisting of magnesium or lithium bromide containing a small proportion of lithium chromate as an inhibitor. Or I may employ a zinc anode with an electrolyte consisting of sodium or potassium hydroxide containing dissolved zinc oxide and with a depolarizing layer of mercuric oxide-graphite mixture.

I claim:

1. A battery comprising a pair of supporting ribbons of dielectric material, spaced layers of electrically conductive coating on said ribbons, metallic members to serve as anodes covering a portion of each of said layers, one of said ribbons being superposed on the other with the coated sides facing each other and arranged out of alignment to bring the anode of each layer of one ribbon in registration with the uncoated covered portion of the other ribbon to form completed cells and to form a conductive connection between each adjacent pair of cells.

2. A battery comprising a pair of elongated supporting members of dielectric material, a series of spaced connected cell units of opposite polarity on each supporting member, one of said supporting members being superposed on the other with the cell units of the two supporting members facing each other, the supporting members being arranged to bring the positive cell elements on one ribbon opposite the negative cell elements of the other supporting member and to provide electrically conductive connections between each adjacent pair of cells.

3. An element for use in the manufacture of dry cells comprising a ribbon of dielectric material and cell elements of opposite polarity mounted thereon in alternate sequence, each element being electrically connected to one neighboring element and insulated from the other.

4. An element for use in the manufacture of dry cells comprising a ribbon of dielectric material, spaced anodic and cathodic cell elements mounted thereon in alternate sequence, each element being electrically connected to one neighboring element, and a bibulous separator strip superposed on said ribbon, said strip being narrower than the ribbon, covering the anodic elements, and being provided with an opening over each cathodic element.

5. An element for use in the manufacture of dry cells comprising a ribbon of dielectric material, spaced cell elements of opposite polarity mounted thereon in alternate sequence, each element being electrically connected to one neighboring element, and a bibulous separator strip superposed on said ribbon, said strip being narrower than the ribbon and being rendered impervious to electrolyte at areas between said cell elements.

6. A battery comprising a pair of ribbons of dielectric material, anodic and cathodic cell elements electrically connected in pairs and mounted in alternate sequence on the face of each ribbon, said ribbons being assembled face to face and sealed at their edges, the cell elements of one ribbon facing the elements of opposite polarity of the other ribbon.

7. A battery comprising a pair of ribbons of dielectric material, anodic and cathodic cell elements electrically connected in pairs and mounted in alternate sequence on the face of each ribbon, said ribbons being assembled face to face and sealed at their edges, the cell elements of one ribbon facing the elements of opposite polarity of the other ribbon, and a bibulous separator containing electrolyte interposed between the anode and cathode of each cell, the electrolyte of each cell being isolated from the electrolyte of adjacent cells.

8. A flexible battery belt comprising a plurality of serially connected substantially flat cells with connecting means between opposite polarity electrodes of consecutive cells in the belt, said connecting means comprising a flexible conductive strap integral at one end with one of said electrodes.

9. A battery belt comprising a plurality of serially connected independent flat dry cells with each cell having at least one of its electrodes extending beyond the cell to provide an electrical and mechanical strap connection to an opposite polarity electrode of an adjoining cell in said belt, and a flexible insulating casing enclosing said belt, said casing having portions between adjoining cells of said belt sealed together and to said strap connection to separately seal each cell.

10. A continuous battery strip comprising a plurality of serially connected dry cells each having a pair of substantially flat overlying electrodes with one electrode of each cell extending therefrom in a common direction to overlap the opposite polarity electrode of the next cell in said strip in said direction in conductive relationship thereto.

11. An electric dry battery wherein a plurality of flat battery cells, each cell including an electrolyte cell element with an anode and a cathode and a bonded electrical connector connecting an anode of one cell to a cathode of an adjacent cell, are arranged in a common sheath of flexible electrolyte-resisting dielectric material, said sheath being applied to said plurality of cells to form separate compartments within which said cells are individually enclosed, whereby said sheath prevents the escape of electrolyte from one cell to another while electrical contact between cells is obtained through said electrical connectors.

12. A method of making a primary dry battery which comprises providing a first strip of dielectric, electrolyte-resistant flexible plastic, positioning a plurality of anode and cathode units on said strip, positioning a second set of said electrodes on a second strip of said plastic, superimposing said first strip over said second strip in such relationship that each anode of said first strip lies opposite a cathode on said second strip, interposing a flat depolarizer mix cake and an electrolyte carrier between each pair of opposed anodes and cathodes, and thereafter sealing the opposed edges of said plastic strips.

No references cited.